United States Patent [19]

McCorkel

[11] Patent Number: 4,475,671
[45] Date of Patent: Oct. 9, 1984

[54] LIP VIBRATOR UNLOADER

[75] Inventor: Franklin M. McCorkel, Leola, Pa.

[73] Assignee: Aggregates Equipment, Inc., Leola, Pa.

[21] Appl. No.: 320,606

[22] Filed: Nov. 12, 1981

[51] Int. Cl.³ .............................................. B65G 65/40
[52] U.S. Cl. ..................................... 222/196; 222/199; 198/533; 366/117
[58] Field of Search .................... 222/408.05, 409, 459, 222/199, 200, 161, 196, 457; 366/117, 118, 120; 198/533, 540

[56] References Cited

U.S. PATENT DOCUMENTS

| | | | |
|---|---|---|---|
| 5,992 | 12/1848 | Bartlett | 222/199 |
| 1,204,522 | 11/1916 | Wall | |
| 1,460,573 | 7/1923 | Church et al. | |
| 1,589,082 | 6/1926 | Albers | |
| 2,233,652 | 3/1941 | Ticknor et al. | 198/56 |
| 2,253,324 | 3/1941 | Moreland | 18/55 |
| 2,276,382 | 3/1942 | Francis | 222/199 |
| 2,337,667 | 12/1943 | Kuehlman | 10/163 |
| 2,339,776 | 1/1944 | Ferrell | 110/101 |
| 2,539,070 | 1/1951 | Gebo | 198/53 |
| 2,544,576 | 6/1951 | Weber | 222/409 |
| 2,649,224 | 8/1953 | Bardet | 222/197 |
| 2,792,030 | 5/1957 | Wahl | 141/145 |
| 2,801,729 | 8/1957 | Hejtmanek | 198/53 |
| 2,802,603 | 8/1957 | McCray | 222/457 |
| 2,815,135 | 12/1957 | Kullmar | 214/18 |
| 2,865,109 | 12/1958 | Bardet | 198/540 X |
| 2,869,991 | 1/1959 | Williams et al. | 222/200 |
| 2,897,956 | 8/1959 | Damond | 198/220 |
| 3,083,811 | 4/1963 | Musschoot | 198/53 |
| 3,305,067 | 2/1967 | Mayer | 198/30 |
| 3,338,385 | 8/1967 | Sage | 198/220 |
| 3,358,815 | 12/1967 | Musschoot | 198/220 |
| 3,399,466 | 9/1968 | Hartley | 34/167 |
| 3,707,222 | 12/1972 | Hartley | 198/57 |
| 4,131,193 | 12/1978 | Musschoot | 198/533 |
| 4,361,254 | 11/1982 | Teraoku et al. | 222/196 |

FOREIGN PATENT DOCUMENTS 758028  10/1933  France ............................. 198/533

Primary Examiner—Joseph J. Rolla
Assistant Examiner—Frederick R. Handren
Attorney, Agent, or Firm—Martin Fruitman

[57] ABSTRACT

A vibrator feeder for causing piled up granular material to move down its own slope and off the edge of a shelf-like structure for unloading. The vibration is limited to material resting on a small edge, or lip, of the material support structure. This lip is formed as an extension of the floor of the bin. A series of rods supported from a vibration generator extend into the material resting on the lip. The vibrations disturb the angle of the repose of the material which feeds off the lip.

1 Claim, 2 Drawing Figures

LIP VIBRATOR UNLOADER

SUMMARY OF THE INVENTION

This invention deals generally with conveyors and more specifically with a gravity conveyor system which uses a vibrating means to affect the flow of material.

The use of vibration producing mechanisms in conveyor systems is well established. They are used in several ways. One is the essential motive means for conveyors, in that the material is moved essentially by the vibration of a slightly sloped conveyor. Another use is as an auxilliary device in a hopper, where vibration is used to keep the material from forming a bridge. Vibration is also used as an unloading aid for hoppers, where vibration of the hopper or bin encourages the material to continue when its angle of repose would normally prevent flow.

This latter use is addressed in the present invention. This approach to unloading bins has not received the use it might have because the power required to produce the vibratory motion has been so great. In a conventional system the power required is largely dependent on the weight and height of the material stored, and therefore usually requires exceptionally large motors and power sources. In order to have, for instance, wheat flow out of an opening at the bottom of a side of a hopper, it has been necessary to vibrate the whole bottom plate of the hopper. Since the entire load of wheat is resting on this plate, it, understandably, requires a great deal of motive force.

The present invention dramatically reduces the power required to cause material flow in such a situation. This is accomplished by constructing a shelf in the nature of a false bottom, under the edge of the hopper where the side opening is located. For instance, in a rectangular shaped bin with an opening at the bottom of one side, this secondary shelf parallels the opening, and extends both under the actual hopper bottom and somewhat beyond the plane of the open-bottomed side. The stored material thus spills out onto the secondary shelf with its normal angle of repose. The secondary shelf, however, supports only the small amount of spillage, and not the weight of the entire hopper. The extension of the seconary shelf beyond the bottom plate is adjusted to closely match the length of the spillage of the material, as determined by the size of the hopper opening and the angle of repose of the material, so that, when the system is at rest, the material spills just to the edge of the secondary shelf.

Thus, when the secondary shelf is vibrated the material feeds off the lip of the shelf onto, for instance, another conveyor or a waiting vehicle. Since the secondary shelf supports only a very limited amount of the material, the power required to vibrate it is minimal compared to the power required for conventional vibrator unloaders. Moreover, the minimal weight drastically reduces the size of the structure required to support the material to be vibrated and thus the power required is reduced even further. Similarly, the cost of the support structure is dramatically reduced.

An alternate embodiment of the invention uses vibrating rods emplaced within the spillage on the bin bottom plate. These rods function as does the secondary shelf, but in this case not even the weight of the shelf need be vibrated, and the power used is even further reduced. In this embodiment the bottom of the bin is itself extended just beyond the point to which the spillage from the opening extends. A series of rods is located near the edge of the bottom and extending close enough to the bottom plate to be immersed in the material, so that, when these rods are vibrated, they affect the angle of repose of the material sufficiently to cause the material to flow over the lip of the bottom plate.

The result of the present invention is a vibrator type unloader which performs the same job as prior art unloaders, but does so with far less initial cost because of the simplicity of the structure and much less power consumption.

DETAILED DESCRIPTION OF THE INVENTION

Figure 1:
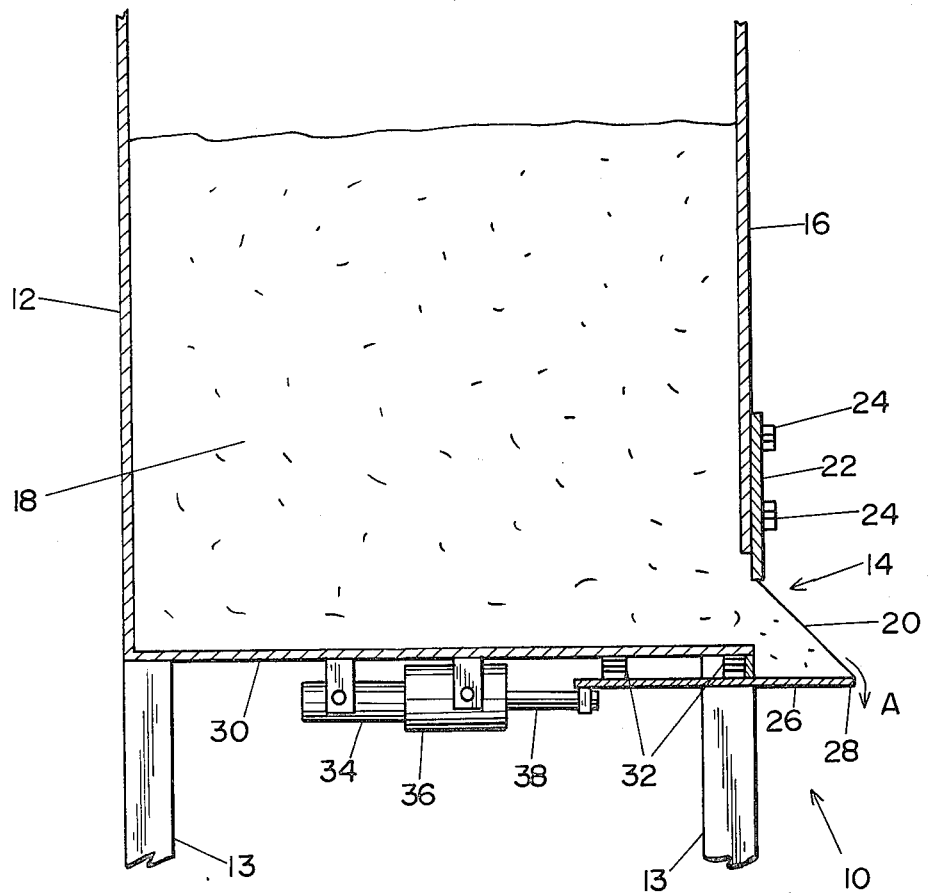
FIG. 1 is a cross sectional side view of the preferred embodiment of the invention shown installed upon a straight sided bin.

The preferred embodiment of the invention is shown in FIG. 1 in which lip vibrator 10 is shown installed in association with straight sided bin 12 supported on legs 13. Bin 12 is constructed with opening 14 in side 16, through which material 18 spills in sloped pile 20. Gate 22, adjustably attached to side 16 by bolts 24, is used to control the distance sloped pile 20 progresses along plate 26 and how closely it approaches lip 28. Ideally pile 20 should be set to just approach lip 28, but not spill over.

Shelf 26 is resiliently supported from bin bottom plate 30 by hangers which may be any conventional resilient support, such as springs 32 and which permit vibration of shelf 26 with minimal transfer of vibration to bottom plate 30. Shelf 26 is vibrated by motor 34 driving vibration generator 36 coupled to shelf 26 by rod 38.

As shelf 26 is vibrated, motion is induced in the top surface of pile 20 which causes the material to progress over lip 28 in direction A. Material 18 can thus be loaded into a vehicle or onto another conveyor (not shown) and the unloading process can be controlled by activating motor 34 with a conventional controller (not shown).

The clear benefit of the invention as shown is that the only material that is actually subject to vibration is the small amount in pile 20. The weight that must be moved by the vibrating mechanism is, therefore, very small compared particularly to the weight that would be moved if bottom plate 30 were vibrated. The reduced weight which is vibrated dramatically reduces both the power required by motor 34 to activate the vibrator, and the strength of springs 32 required to support shelf 26.

Figure 2:
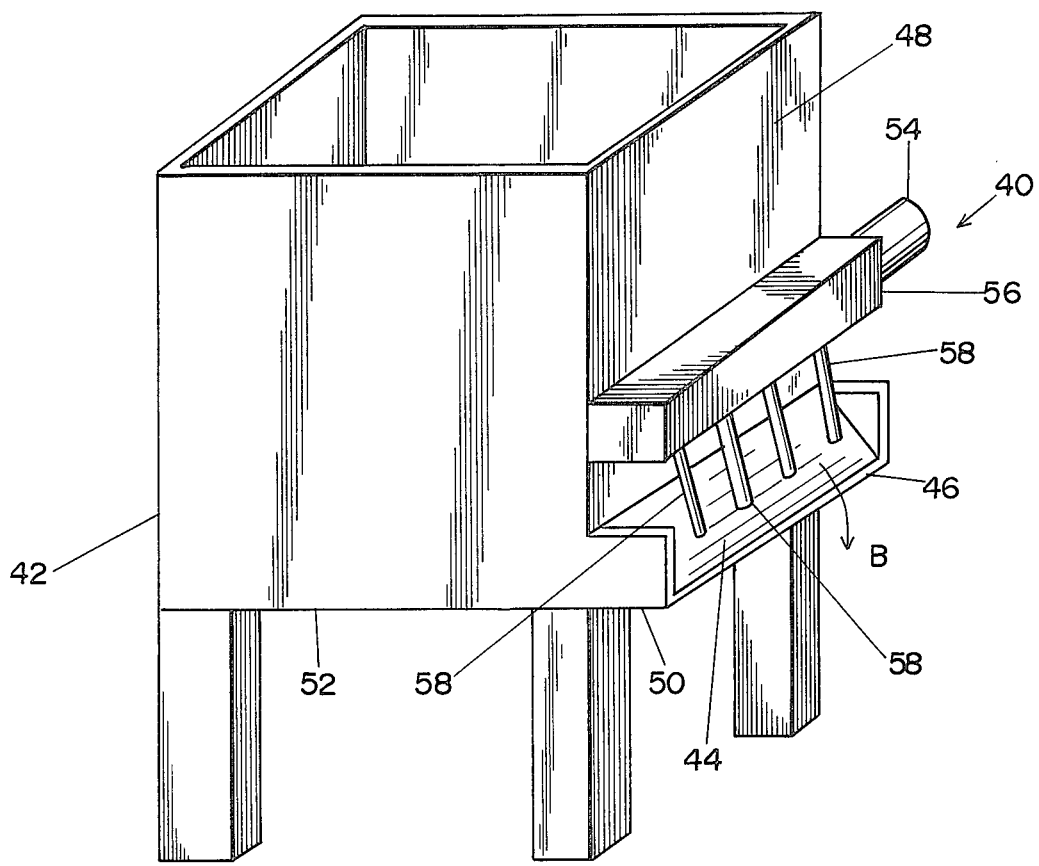
FIG. 2 is a perspective view of the alternate embodiment of the invention using vibrating rods.

An alternate embodiment of the invention is shown in FIG. 2 in which vibrating rod assembly 40, attached to material bin 42, creates the disturbance within material pile 44 to cause the upper layer of pile 44 to move downward and over lip 46 in direction B. In this embodiment, bin 42 is constructed as in the previous embodiment, with an opening at the bottom of side 48, but spillage support shelf 50 is an integral part of bin bottom 52. Material pile 44 therefore extends onto shelf 50, but rests there undisturbed until motor 54 is turned on to activate vibration generator 56 causing rods 58, whose ends are buried within material pile 44, to vibrate. The quantity of rods 58, their spacing and location and the intensity of their motion, is selected to induce agitation over the entire surface of material pile 44. This causes a general flow of the material over lip 46 in path B and the material that is thereby unloaded is replaced by other material flowing out of bin 42, which then also flows over lip 46, providing the vibration continues.

A controlled bin unloading action therefore results which uses very little more power than is required to vibrate the rods alone. While the power required does vary with the weight and friction factor of the material it is also controllable by the proximity of rods 58 to lip 46, and in all cases is far less than the power which would be required to vibrate any part of bin 42 along with the weight of material supported.

A further advantage of this vibrating rod embodiment is that no material support structure at all is required to be vibrated, thereby eliminating any need for a resilient support on a structural member. Moreover, the inherently simple construction of this embodiment permits its addition to existing bins with minimal difficulty.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, the vibrating rod embodiment can also be constructed upon a bin with an adjustable gate as in FIG. 1, and the invention can also be used with hopper type bins by construction of a horizontal vibrating shelf below their opening. Moreover the shelf or vibrating rod assembly need not be attached to the bin but can be independently supported.

What is claimed as new and desired to be secured by Letters Patent of the United States is:

1. A bin unloading apparatus comprising:
    a storage bin for solid material, with an opening in the bin permitting the stored material to flow out from under the material in the bin to a limited extent, so that a stationary sloping pile of material forms outside the opening when support for the pile exists, without any of the weight of the material in the bin upon the pile;
    a structurally supported shelf located outside the storage bin, in close proximity to the opening in the bin, so that a pile of material flowing from the bin rests upon and is supported by the shelf without any of the weight of the material within the bin supported by the shelf; and
    vibrating means mechanically isolated from the storage bin and its contents but mechanically coupled to and vibrating a pile of material resting upon the shelf;
    wherein the shelf is constructed as an extension of the bin bottom and the vibrating means comprises at least one rod, attached to and activated by a vibration generator, with one end of each rod located in close proximity to the top of the shelf edge, so that one end of each rod is buried in any material resting on the shelf.

* * * * *